(12) United States Patent
Baldwin et al.

(10) Patent No.: US 7,895,730 B2
(45) Date of Patent: Mar. 1, 2011

(54) METHOD OF CONTROLLING EFFECTIVE IMPEDANCE IN A SUPERCONDUCTING CABLE

(75) Inventors: Thomas L. Baldwin, Tallahassee, FL (US); Michael Steurer, Crowfordville, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 1142 days.

(21) Appl. No.: 11/541,618

(22) Filed: Oct. 2, 2006

(65) Prior Publication Data

US 2007/0075811 A1    Apr. 5, 2007

Related U.S. Application Data

(60) Provisional application No. 60/723,153, filed on Oct. 3, 2005.

(51) Int. Cl.
*H01B 12/02*    (2006.01)
(52) U.S. Cl. .............................. 29/599; 307/90; 323/352
(58) Field of Classification Search .................... 29/599, 29/825, 828; 307/90; 323/352; 505/869, 505/856, 857
See application file for complete search history.

(56) References Cited

U.S. PATENT DOCUMENTS 4,032,959 A * 6/1977 Boom et al. .................. 323/234
5,475,560 A * 12/1995 Onishi et al. ................. 361/141

OTHER PUBLICATIONS

U.S. Appl. No. 60/723,153.

* cited by examiner

*Primary Examiner* — A. Dexter Tugbang
*Assistant Examiner* — Livius R Cazan
(74) *Attorney, Agent, or Firm* — J. Wiley Horton

(57) ABSTRACT

A method of controlling the effective impedance of a low-impedance high-temperature superconducting cable ("HTS cable"). Passive or active control circuitry is used to create a current in the shielding conductor of the HTS cable which opposes the current in the primary conductor. In the case of a three-phase conductor, magnetic cross-coupling between the phases is exploited. The magnitude of the magnetic field is used to alter the HTS cable's effective impedance. The result is the creation of a controlled and substantially-higher effective impedance for the HTS cable. The creation of the higher impedance allows the HTS cable to be connected in parallel with conventional lines while regulating the amount of current flowing through the HTS cable.

18 Claims, 8 Drawing Sheets

METHOD OF CONTROLLING EFFECTIVE IMPEDANCE IN A SUPERCONDUCTING CABLE

CROSS-REFERENCES TO RELATED APPLICATIONS

This is a non-provisional application which claims the benefit, pursuant to 37 C.F.R. §1.53(c) of an earlier-filed provisional application. The provisional application listed the same inventors and was assigned Ser. No. 60/723,153 filed Oct. 3, 2005.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of electrical devices. More specifically, the invention comprises a method for controlling effective impedance in a superconducting cable.

2. Description of the Related Art

Recent developments have allowed the commercialization of high-temperature superconducting ("HTS") power distribution cables. These cables have a much higher power density that conventional transmission lines. They also undergo substantially lower resistive losses. The application of HTS cables to existing power grids is therefore expected in the near future.

While there are several designs for HTS cables, the currently favored approach uses a cold-dielectric coaxial cable with HTS shielding. FIG. 1 illustrates a typical construction for such a cable, labeled as HTS cable 10. It includes several concentric layers. Structural core 12 lies at its center. This component may be stranded copper, similar to that found in conventional electrical transmission lines. However, its function is primarily to carry the tensile mechanical load of the cable. Though it may carry some electrical current, this is incidental.

The next layer is HTS conductor tape 14. This carries the electrical line current of the HTS cable. The next layer is high voltage ("HV") dielectric 16. HTS shield tape 18 is wrapped over HV dielectric 16. As will be explained subsequently, a substantial voltage potential can exist between HTS conductor tape 14 and HTS shield tape 18. The dielectric prevents a short circuit between the two.

Liquid nitrogen coolant 20 flows over HTS shield tape 18. This layer of cooling fluid is typically pumped under pressure to cause a steady flow. Thus, everything inside the layer of liquid nitrogen is immersed in a cryogenic "bath." The temperature of these components is maintained at or slightly above the temperature of the liquid nitrogen. The liquid nitrogen is contained by inner cryostat wall 22. A gap—in which a vacuum is generally maintained—exists between inner cryostat wall 22 and outer cryostat wall 24. This gap may sometimes be filled by an insulating material having extremely low thermal conductivity. Protective cover 26 overlies the entire assembly and provides additional mechanical strength.

Those skilled in the art will know that a variety of construction techniques are used to create HTS cables. The one shown in FIG. 1 is only one example. Additional components can be added. For instance, a copper winding can be added over HTS shield tape 18 in order to add additional mechanical strength. The methods disclosed herein are applicable to virtually any type of cable construction. Thus, the details shown in FIG. 1 should be viewed only as an example.

Those skilled in the art will be familiar with the concept of impedance. Impedance is a very important principle in the analysis of alternating currents. It can be understood by reviewing the equations relating voltage to current in resistors, inductors, and capacitors. These equations are as follows:

$$V = RI \quad \text{(resistor)}$$
$$V = j\omega L I; \quad \text{(inductor) and}$$
$$V = \left(\frac{1}{j\omega C}\right)I \quad \text{(capacitor)}.$$

All of these equations can be expressed as V=ZI, where "Z" stands for impedance.

The impedance of an HTS cable is a significant factor when such a cable is integrated into a power distribution network. Power distribution networks typically involve parallel connections of multiple transmission lines. This serves to create redundancy, as well as providing the ability to route capacity where it is needed.

FIG. 2 shows a simple parallel power grid 28. Five lines are involved. A first set of two conventional power lines goes from point J to Point K to Point M. A second set of two conventional lines goes from Point J to Point L to Point M. HTS cable 10 has been routed directly from point J to Point M. The distance for each segment (in kilometers) is shown in the figure. 600 MW is fed into Point J and extracted from Point M (ignoring resistance losses).

The resistance and inductance of the HTS cable is drastically lower than the conventional power lines. The following table provides these properties:

TABLE I

| Type | Resistance (Ω/km) | Inductance (mH/km) |
| --- | --- | --- |
| HTS | 0.0001 | 0.06 |
| Conventional | 0.08 | 1.26 |

Thus, with no impedance modification to the HTS cable, it will be the path of least resistance for the current flowing into the parallel power grid. The result is that the HTS cable will carry 564 MW, while the two conventional cables will carry 18.1 MW (for the cable in the top part of FIG. 2) and 17.9 MW.

The reader will therefore understand that if the HTS cable is connected in parallel with conventional lines, the vast majority of the current will "dump" into the HTS cable. The current capacity of the conventional lines will likewise be under-utilized.

In addition to the concern of under-utilizing existing transmission lines, this phenomenon is troublesome for the HTS cable as well. The HTS cable only maintains its superconductivity if the temperature of the superconductor is maintained below a certain threshold. Increasing the current through the cable increases the resistance loss, which drives up the temperature. Driving up the temperature, as is commonly known, increases the cable's resistance (even while below the temperature threshold where superconductivity is lost). This thermal load can eventually overwhelm the liquid cooling system, resulting in a self-accelerating problem: More load causes more heat, which causes more resistance, which causes still more heat, etc.

If the cooling system is overwhelmed, the HTS cable's temperature will rise above the superconductivity threshold. At that point, resistance will spike dramatically (often referred to as "quenching"). The HTS cable may physically fail. Even if it does not, a sudden surge of current will transfer to the conventional lines, possibly causing them to fail.

Thus, in a grid like the one shown in FIG. 2, the inability to direct current flows in desired ratios is a substantial disadvantage. Having the ability to control the effective impedance of the HTS cable is therefore desirable.

BRIEF SUMMARY OF THE INVENTION

The present invention is a method of controlling the effective impedance of a low-impedance high-temperature superconducting cable ("HTS cable"). Passive or active control circuitry is used to create a current in the shielding conductor of the HTS cable which opposes the current in the primary conductor. In the case of a three-phase conductor, magnetic cross-coupling between the phases is exploited. The magnitude of the magnetic field is used to alter the HTS cable's effective impedance. The result is the creation of a controlled and substantially-higher effective impedance for the HTS cable. The creation of the higher impedance allows the HTS cable to be connected in parallel with conventional lines while regulating the amount of current flowing through the HTS cable.

REFERENCE NUMERALS IN THE DRAWINGS

| 10 | HTS cable | 12 | structural core |
|---|---|---|---|
| 14 | HTS conductor tape | 16 | HV dielectric |
| 18 | HTS shield tape | 20 | Liquid nitrogen coolant |
| 22 | inner cryostat wall | 24 | outer cryostat wall |
| 26 | protective cover | 28 | parallel power grid |
| 30 | conventional cable | 32 | 3-phase power source |
| 34 | AC load | 36 | active current control |
| 38 | 3-phase HTS circuit | 40 | single phase conductor |
| 42 | single phase shield | 44 | conductor |
| 46 | shield | 48 | magnetic field |
| 50 | passive impedance control | | |

DETAILED DESCRIPTION OF THE INVENTION

Figure 2:
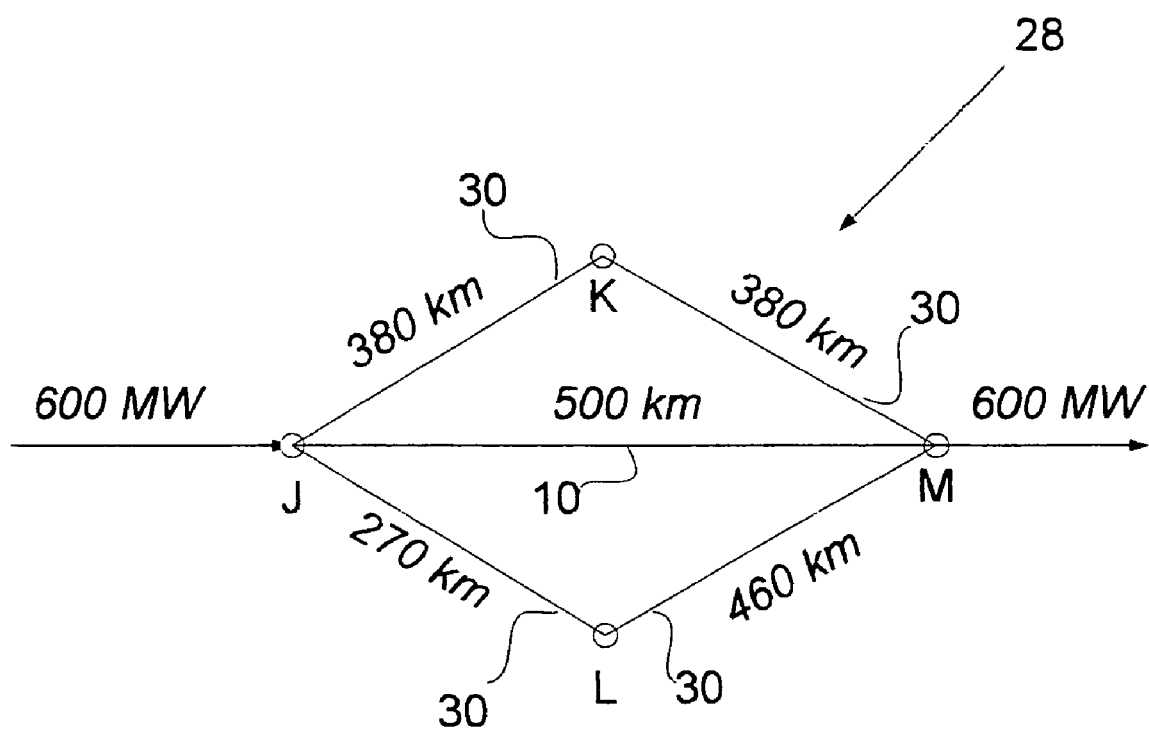
FIG. 2 is a schematic view, showing a parallel power grid.

Returning briefly to FIG. 2, the reader will recall that an objective of the present invention is to regulate the impedance of HTS cable 10 so that it does not carry a disproportionate amount of current running through the system as a whole. Those skilled in the art will know that each of the "shown" in FIG. 2 is actually a 3-phase circuit. Thus, each circuit includes three separate conductors, with each conductor carrying only one phase.

Figure 1:
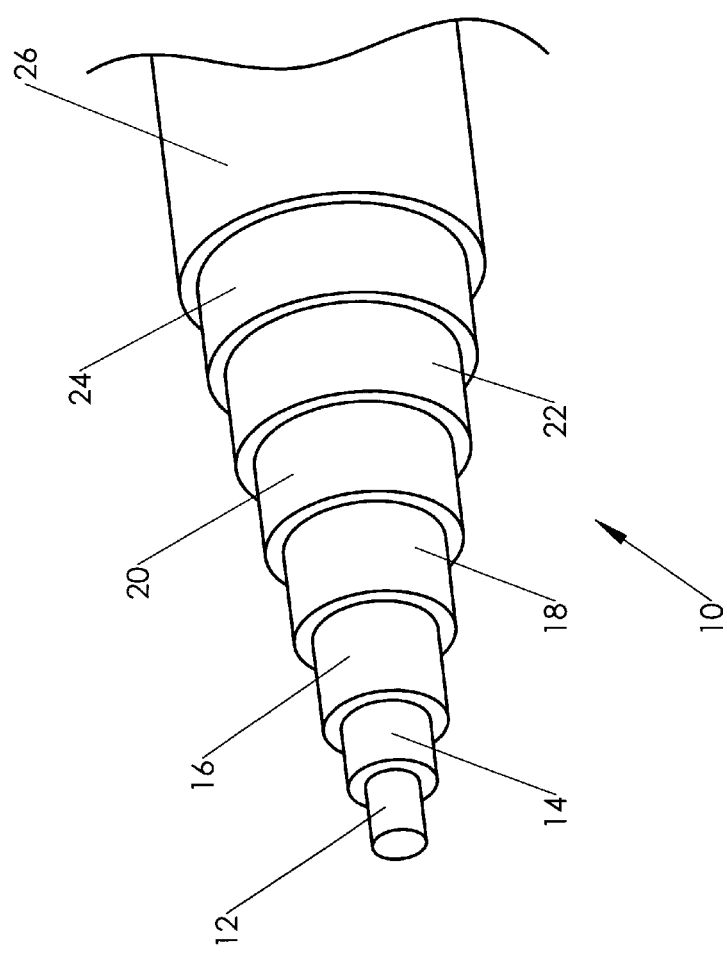
FIG. 1 is a perspective view, showing the construction of an HTS cable.
Figure 3:
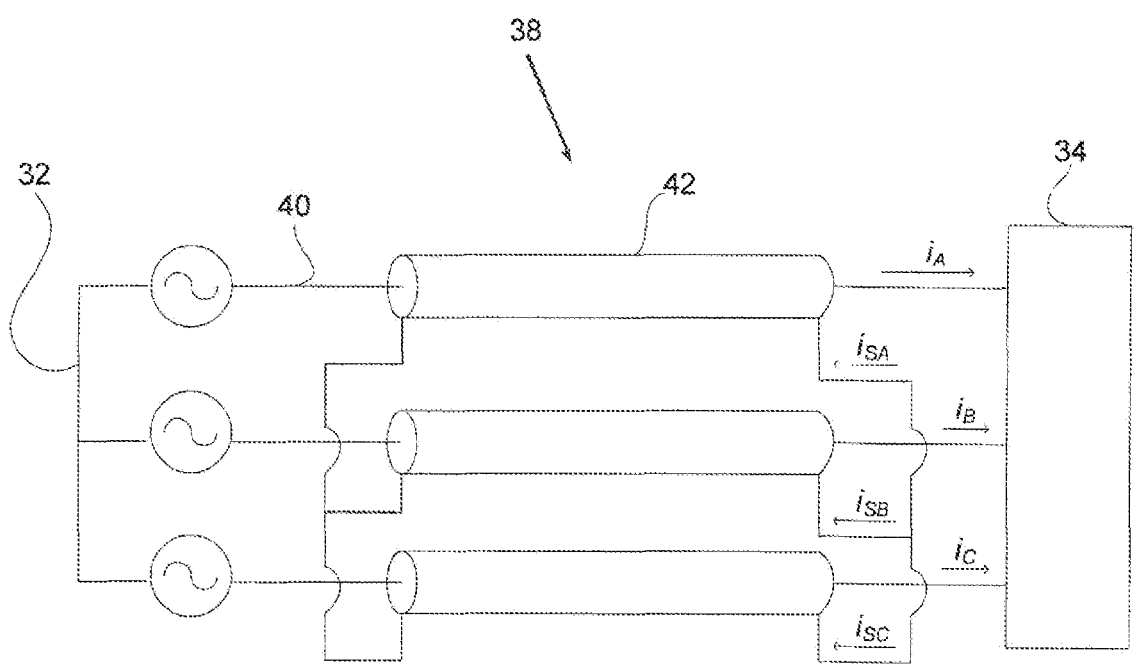
FIG. 3 is a schematic view, showing a shielded HTS cable.

FIG. 3 shows a schematic representation of a 3-phase HTS cable circuit. The actual physical construction of the HTS cable is represented very simply. For each phase, there is a single phase conductor 40 and a single phase shield 42. The single phase conductor 40 corresponds to HTS conductor tape 14 in FIG. 1, while single phase shield 42 corresponds to HTS shield tape 18.

3-phase power source 32 is connected to AC load 34 via the three single phase conductors. The single phase conductors therefore carry currents $i_A$, $i_B$, and $i_C$. The three single phase shields are simply connected in parallel, creating three distinct current loops. The single phase shields therefore carry currents $i_{SA}$, $i_{SB}$, and $i_{SC}$.

The three phases are carried through individual, single phase cables. Thus, cross country transmission lines have three cables which are separated by a reasonable distance. Cross-coupling between the phases—resulting from electromagnetic effects—is a well known phenomenon. In theory, it is possible to confine the magnetic field of a single phase HTS cable within the cable itself. Some amount of stray magnetic field may be acceptable, however. In fact, since such a stray magnetic field can be useful for altering the effective impedance of the cable, it may even be desirable.

Figure 4:
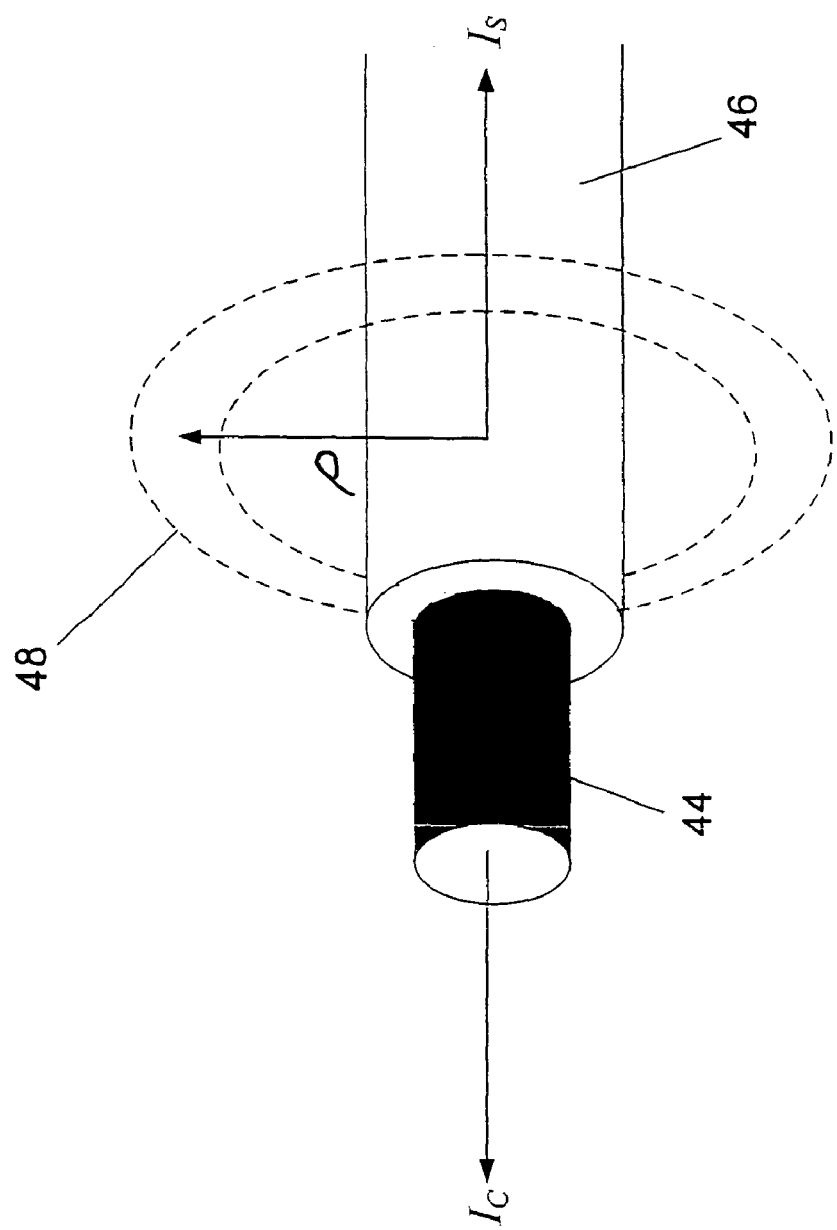
FIG. 4 is a perspective view, showing a magnetic field generated around an HTS cable.

FIG. 4 shows a simple representation of an HTS cable comprising conductor 44 and shield 46. Dielectric insulation, cooling structures, and other features are not shown, but the reader should assume that the conductor and the shield are perfectly insulated. Current flowing through the cable will create magnetic field 48 surrounding the cable. If a current $I_c$ is passed through the conductor and an opposite current $I_s$ is passed through the shield, then the magnetic field at a point outside the cable can be expressed as:

$$H = \frac{i_c - i_s}{2\pi\rho},$$

where $\rho$ is the radial distance from the cable's center.

From this expression, it is obvious that if the conductor current and the shielding current are equal, then the magnetic field will be contained entirely within the cable. if they are unequal, however, an external field will exist. This external field will cross-couple with the other phases (assuming the other conductors are physically close by) and will alter the effective impedance.

The amount of magnetic flux outside the cable controls the inductance of the line. The inductance has four components: (1) the self inductance, $L_{self}$, (2) the mutual inductance with the shield, $M_{cs}$, (3) the mutual inductance with the second phase, $M_{12}$, and (4) the mutual inductance with the third phase, $M_{13}$. Assuming balanced conditions between the three phases, the single-phase representation of the inductance of the entire HTS cable can be expressed as:

$$L = L_{self} + M_{cs} + M_{cs}\frac{i_s}{i_c} + M_{mc}\frac{i_c - i_s}{i_c},$$

where $M_{mc}$ is the mutual coupling to the other two phases, which is equal to $M_{12}$ and $M_{13}$ under balanced power conditions with equally spaced cables.

Figure 6:
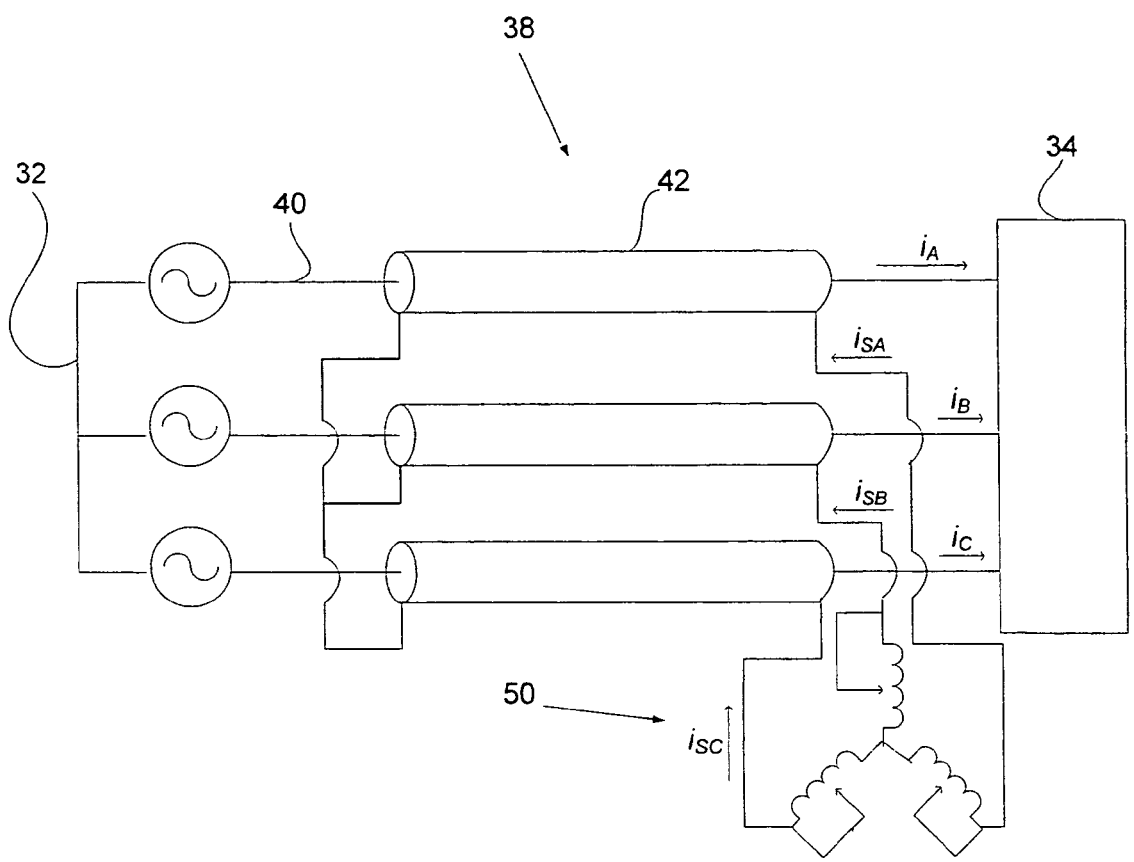
FIG. 6 is a schematic view, showing the use of passive impedance control.

From this expression, the reader will observe that by regulating the shield current, the line inductance can be altered. There are several approaches to controlling the shield current. One simple approach is passively controlling the shield current through inductive impedance. FIG. 6 is a schematic view showing this approach. Passive impedance control 50 has been added to the three shield lines. Passive impedance control 50 is simply a 3-phase "wye" of three variable inductors.

Figure 5:
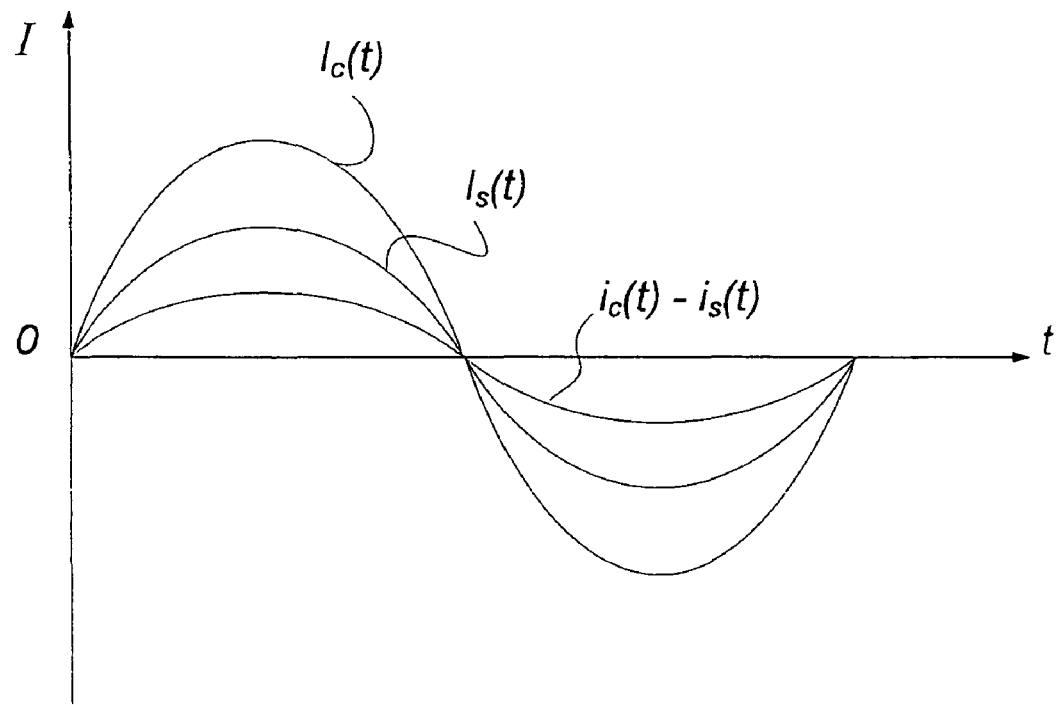
FIG. 5 is a graphical view, showing current flow in an HTS conductor.
Figure 5:
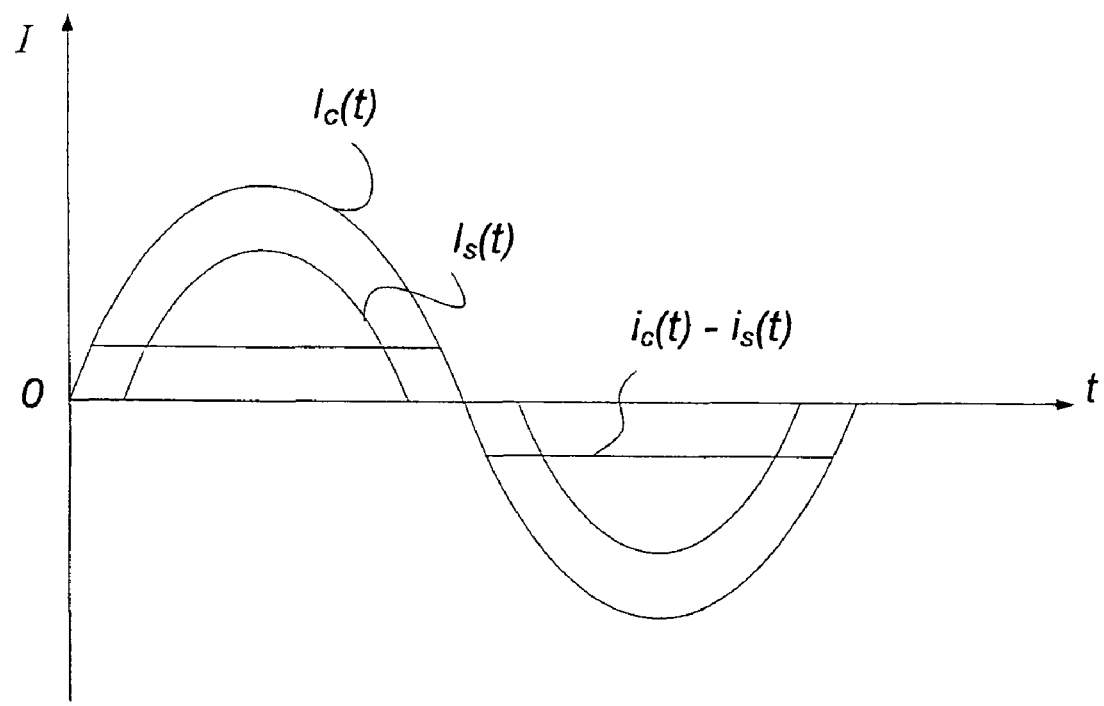

The resulting conductor and shield current flows are depicted in the upper view of FIG. 5, where $i_c$ is the conductor current and $i_s$ is the shield current. The passive approach only controls the effective impedance by reducing the shielding effect of the HTS shield (allowing magnetic "leakage"). The drawback of this approach is that the magnetic field created by the adjacent phases will partially penetrate the conductor of each phase. This cross-coupling will reduce the current carrying capacity of the conductor. While this is generally undesirable, some amount of capacity reduction may be acceptable. This is especially true where the HTS cable is being connected in parallel with a conventional grid.

Figure 7:
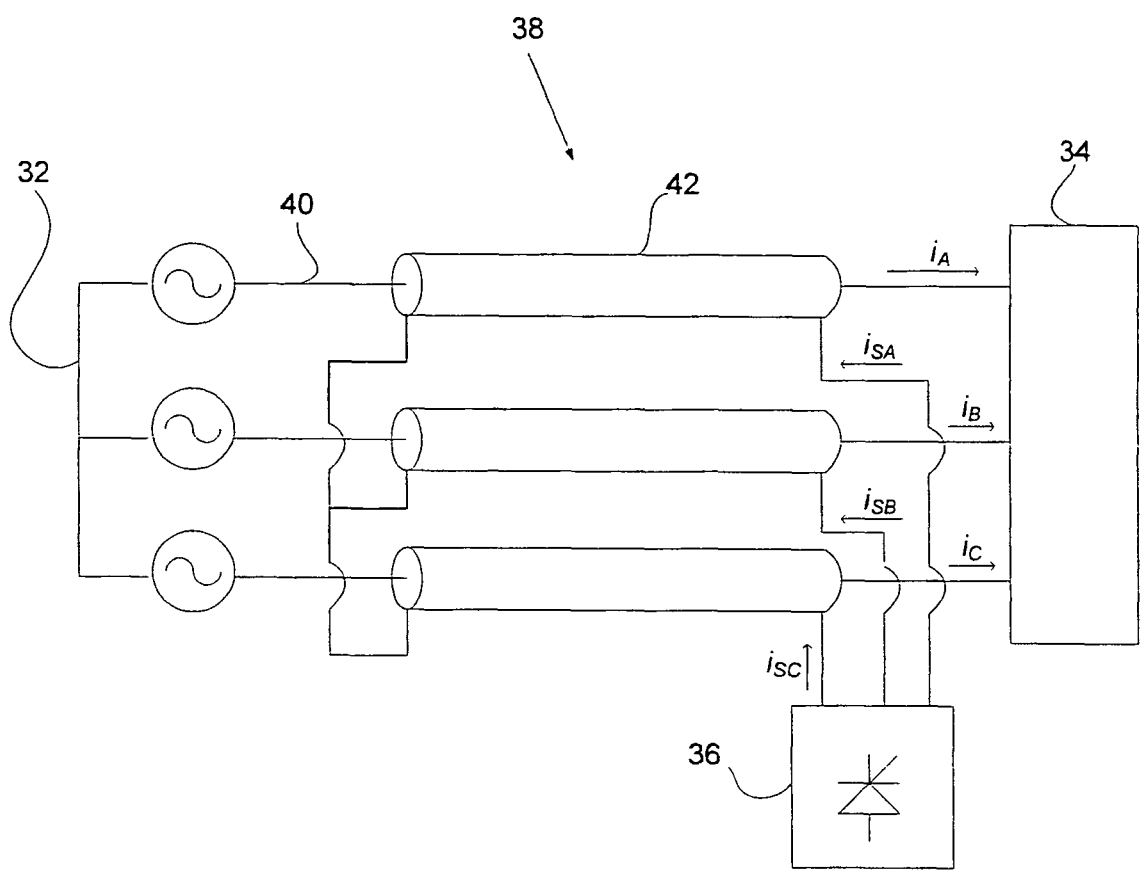
FIG. 7 is a schematic view, showing the use of active impedance control.

A better approach is to actively control the shield currents using power electronics. FIG. 7 shows a schematic view of this approach. Active current control 36 feeds electrical current to each of the single phase shields. It actively controls the waveforms of the shield current $i_{SA}$, $i_{SB}$, and $i_{SC}$. The lower view in FIG. 5 depicts one of the possible conductor current and shielding current waveforms in a single phase.

The rate of current rise near the zero crossings is controlled. During these portions of the oscillating current cycle, full compensation is not required and the instantaneous current is small and manageable. However, near the oscillating current peaks, the full shielding current is allowed. The reader should recall that the shielding current flows in the opposite direction. Thus, the magnetic field outside the cable will be proportional to the expression $i_c(t) - i_s(t)$. This expression is graphically plotted in the lower view of FIG. 5.

The conductor carries current at a very high voltage, in order to reduce $i^2 R$ losses. The shielding current, however, can be near the ground potential. This fact means that the switching and waveform generating operations carried our by active current control 36 are relatively low voltage operations. One of the prime advantages of controlling the shield current is the fact that it can be done with relatively low-voltage devices. Active current control 36 can assume many forms. Any conventional power device can serve, including H-bridges, Thyristors, and IGBT's.

The equations and prior explanation idealize the 3-phase circuit as a steady state. In reality, more sophisticated control will be needed. Those skilled in the art will know that power systems experience phase and frequency shifts over time. Thus, the active control device will need a controller and possibly a feedback loop in order to properly match the conditions in the power grid.

The control techniques described have many applications. Returning to FIG. 2 and Table I, the reader will recall that the uncontrolled HTS cable carries 564 MW out of 600 MW flowing through the grid. The HTS cable carries 15.7 times more current than the conventional line. This distribution can cause the HTS cable to overload, while the conventional lines are clearly under-utilized.

Using the previously described control techniques, the HTS cable's effective impedance can be increased by five times (up to around 0.30 mH/km for a typical arrangement). The maximum impedance possible is determined by the physical spacing between the single phase cables, since the cross-coupling is dependent on physical proximity. However, the aforementioned fivefold increase is realistic for a typical physical spacing of three single phase cables.

The reader will recall the general impedance expression V=ZI, which can be rewritten as I=V/Z. Obviously, increasing the effective impedance in the HTS cable will reduce the current flowing therethrough. The table below illustrates the effect of this change:

TABLE I

| Type | Inductance (mH/km) | Power Carried (MW) |
| --- | --- | --- |
| HTS (modified) | 0.30 | 454.7 |
| Conventional (JKM) | 1.26 | 72.2 |
| Conventional (JLM) | 1.26 | 73.1 |

The conventional lines carry far more current than is the case for the uncontrolled HTS cable. Current in the HTS cable is likewise reduced by nearly twenty percent. The result is an integrated system in which the HTS cable carries most of the load—thereby realizing the advantage of superconductivity—while still utilizing the conventional lines.

Other benefits result. The reader will recall from the prior discussion that "quenching" is a problem for superconducting cables. Quenching can be a self-accelerating problem that is difficult to control. However, in the system depicted in FIG. 7, an impending quench can be avoided. If the temperature within the HTS cable is approaching the superconductivity threshold, active current control 36 can be used to maximize the effective impedance of the HTS cable. This will shift current flow from the HTS cable to the conventional lines. Once the desired temperature is regained, the controller can allow more current back on the HTS cable.

Figure 8:
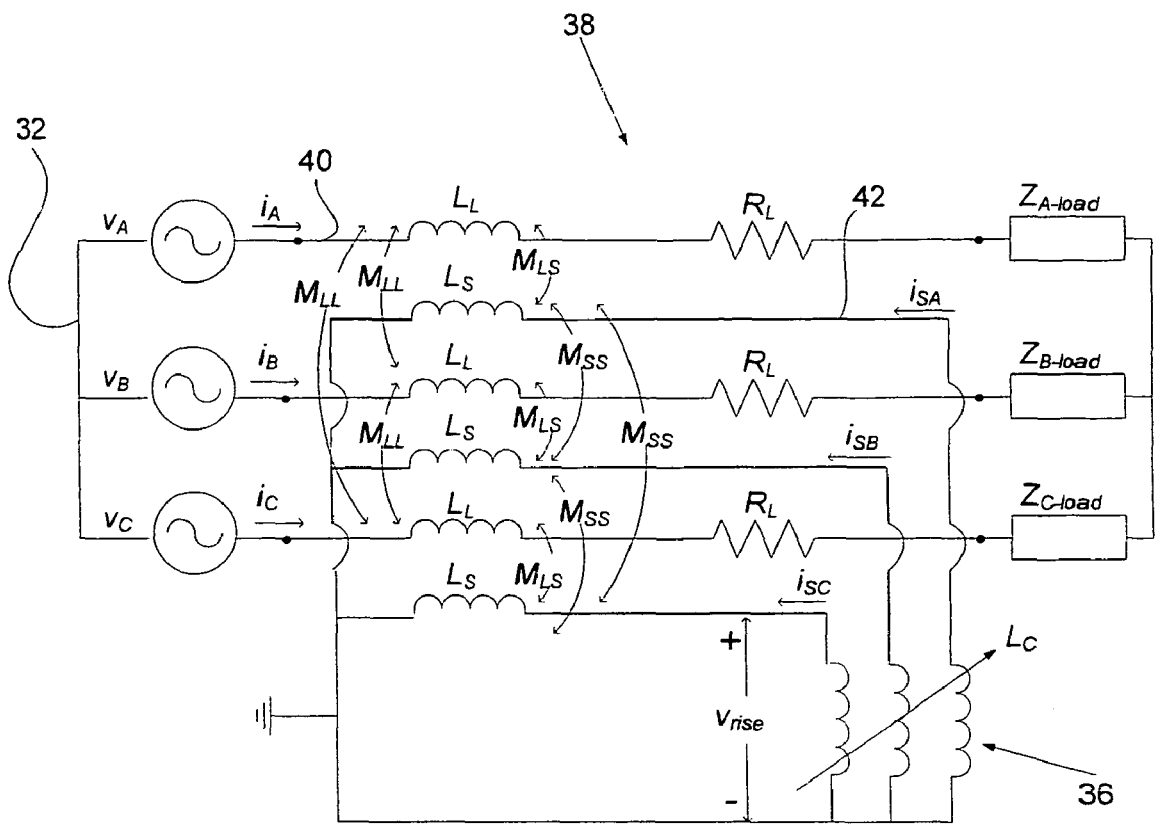
FIG. 8 is a schematic view, showing the use of impedance control and cross coupling between phases in a three phase circuit.

Some detailed discussion of the cross-coupling between the phases may be helpful to the reader's understanding. It is valuable to understand the range for the effective impedance in the HTS cable as well. FIG. 8 shows a schematic of a three phase power distribution circuit. Active current control 36 is represented schematically as three variable inductors. An approximation for the maximum voltage rise in the shielding across the two cable ends ($v_{rise}$) can be developed using the following assumptions:

1. The HTS cable remains in the superconducting state for the whole range of conductor effective impedances ($L_c$);

2. The resistances in the cable's conductor and shield are neglected;

3. The coupling between the cable's conductor and shield forms a weakly coupled transformer with a 1:1 turns ratio; and 4. The system is symmetrically balanced among the phases.

This explanation focuses on Phase A, though it is equally applicable to Phases B and C. $L_s$ is defined as the self-inductance of the shield. $M_{ss}$ is defined as the mutual inductance of the shield to the shields of Phases B and C. $L_{con}$ is defined as the inductance of the controller. The voltage loop equation for the shield circuitry is then:

$$V = 0 = j\omega L_S - j\omega M_{ss}(i_{SB} - i_B) - j\omega M_{SS}(i_{SC} - i_C) - j\omega M_{CS} i_A + j\omega L_{con} i_{SA}$$

According to Kirchhoff's Law, the sum of the shield currents in the three phases must be zero. The expression can therefore be simplified to:

$$0 = j\omega(L_S + M_{SS} + L_{con})i_{SA} - j\omega(M_{LS} + M_{SS})i_A$$

Two voltages are important to the analysis. The first is the open loop voltage on the shield, $v_{sol}$, as a function of the line current. This expression is:

$$v_{sol} = j\omega(M_{CS} + M_{SS})i_A$$

The second important voltage is the voltage rise along the length of the cable, $v_{rise}$. This voltage will be equal to the voltage across the control inductance, $L_{con}$. The expression for this voltage is then:

$$v_{rise} = j\omega L_{con} \frac{(M_{CS} + M_{SS})i_A}{L_S + M_{SS} + L_{con}}$$

The preceding descriptions do contain significant detail regarding the novel aspects of the invention. They should not be construed, however, as limiting the scope of the invention but rather as providing illustrations of the preferred embodiments of the invention. Thus, the scope of the invention should be fixed by the following claims, rather than by the examples given.

Having described our invention, we claim:

1. A method of controlling impedance in a superconducting cable, comprising:
   a. providing a superconducting cable having three separate phases, wherein each of said three separate phases includes
      i. a high temperature superconductor running along a central axis,
      ii. a high voltage dielectric layer surrounding said high temperature superconductor,
      iii. a shielding conductor wrapped over said high voltage dielectric layer and running along said central axis, so that said shielding conductor is concentric with said high temperature superconductor;
   b. providing a relatively high-voltage current traveling in a first direction on said high temperatures superconductors in each of said three phases;
   c. providing a relatively low-voltage current traveling opposite said first direction on said shielding conductors in each of said three phases; and
   d. for each of said three phases, regulating the difference between said current on said high temperature superconductor and said current on said shielding conductor in order to create a magnetic field outside each of said three phases, thereby creating controlled cross-coupling between each of said three phases and altering said impedance of said superconducting cable.

2. A method as recited in claim 1, wherein said step of regulating said difference between said current on said high temperature superconductor and said current on said shielding conductor in order to create a magnetic field outside of each of said three phases, is accomplished by:
   a. providing a wye circuit, including
      i. a central node, a first external node, a second external node, and a third external node,
      ii. a first variable inductor connected between said central node and said first external node,
      iii. a second variable inductor connected between said central node and said second external node,
      iv. a third variable inductor connected between said central node and said second external node,
      v. a conductor connecting a first end of said shielding conductor in said first phase to said first external node,
      vi. a conductor connecting a first end of said shielding conductor in said second phase to said second external node, and
      vii. a conductor connecting a first end of said shielding conductor in said third phase to said third external node; and
   b. providing a parallel connection between a second end of said shielding conductor in said first phase, a second end of said shielding conductor in said second phase, and a second end of said shielding conductor in said third phase.

3. A method as recited in claim 2, further comprising providing a liquid cooling layer flowing over said shielding conductor in each of said three phases.

4. A method as recited in claim 2, further comprising providing a tensile member to carry the majority of tensile load placed on said superconducting cable.

5. A method as recited in claim 1, wherein said step of regulating said difference between said current on said high temperature superconductor and said current on said shielding conductor in order to create a magnetic field outside of each of said three phases, is accomplished by:
   a. providing an active current control device, including
      i. a first shielding current output connected to a first end of said shielding conductor in said first phase,
      ii. a second shielding current output connected to a first end of said shielding conductor in said second phase,
      iii. a third shielding current output connected to a first end of said shielding conductor in said third phase; and
   b. providing a parallel connection between a second end of said shielding conductor in said first phase, a second end of said shielding conductor in said second phase, and a second end of said shielding conductor in said third phase.

6. A method as recited in claim 5, further comprising providing a liquid cooling layer flowing over said shielding conductor in each of said three phases.

7. A method as recited in claim 5, further comprising providing a tensile member to carry the majority of tensile load placed on said superconducting cable.

8. A method as recited in claim 5, wherein said active current control device is an H-bridge.

9. A method as recited in claim 5, wherein said active current control device is a thyristor.

10. A method as recited in claim 5, wherein said active current control device is an IGBT.

11. A method as recited in claim 1, wherein said step of regulating said difference between said current on said high temperature superconductor and said current on said shielding conductor in order to create a magnetic field outside of each of said three phases, is accomplished by:
   a. providing an active current control device, including
      i. a first shielding current output connected to a first end of said shielding conductor in said first phase,
      ii. a second shielding current output connected to a first end of said shielding conductor in said second phase,
      iii. a third shielding current output connected to a first end of said shielding conductor in said third phase;

b. providing a connection between a second end of said shielding conductor in said first phase and said active current control device;
c. providing a connection between a second end of said shielding conductor in said second phase and said active current control device; and
d. providing a connection between a second end of said shielding conductor in said third phase and said active current control device.

12. A method as recited in claim 11, further comprising providing a liquid cooling layer flowing over said shielding conductor in each of said three phases.

13. A method as recited in claim 11, further comprising providing a tensile member to carry the majority of tensile load placed on said superconducting cable.

14. A method as recited in claim 11, wherein said active current control device is H-bridge.

15. A method as recited in claim 11, wherein said active current control device is thyristor.

16. A method as recited in claim 11, wherein said active current control device is an IGBT.

17. A method as recited in claim 1, further comprising providing a liquid cooling layer flowing over said shielding conductor in each of said three phases.

18. A method as recited in claim 1, further comprising providing a tensile member to carry the majority of tensile load placed on said superconducting cable.

* * * * *